(12) United States Patent
Weed

(10) Patent No.: US 6,809,740 B1
(45) Date of Patent: Oct. 26, 2004

(54) DITHERED QUANTIZATION USING NEIGHBORHOOD MASK ARRAY TO APPROXIMATE INTERPOLATE

(75) Inventor: Steven Frank Weed, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 952 days.

(21) Appl. No.: 09/626,709

(22) Filed: Jul. 26, 2000

(51) Int. Cl.$^7$ ................................................. G09G 5/02
(52) U.S. Cl. ..................... 345/589; 345/596; 345/592; 345/600; 345/601; 345/610
(58) Field of Search ................................ 345/589, 596, 345/600, 601, 610

(56) References Cited

U.S. PATENT DOCUMENTS

| | | | | |
|---|---|---|---|---|
| 5,594,854 A | * | 1/1997 | Baldwin et al. | 345/441 |
| 6,008,796 A | * | 12/1999 | Vaswani et al. | 345/442 |
| 6,057,855 A | * | 5/2000 | Barkans | 345/629 |
| 6,279,099 B1 | * | 8/2001 | Van Hook et al. | 712/23 |
| 6,476,810 B1 | * | 11/2002 | Simha et al. | 345/424 |
| 6,744,438 B1 | * | 6/2004 | Baldwin | 345/552 |

* cited by examiner

*Primary Examiner*—Matthew C. Bella
*Assistant Examiner*—Manucher Rahmjoo
(74) *Attorney, Agent, or Firm*—John A. Brady

(57) ABSTRACT

Methods and image forming systems for approximating the value of a function given specified values of input data using a sparse lookup table. Individual samples are quantized and rounded up or down to an adjacent lattice point of the lookup table. Rather than performing multiple lookup table accesses, which are required using conventional linear interpolation, the disclosed data processing techniques require as few as one lookup table access per sample. The quantized samples are obtained by truncating one or more least significant bits, designated as masked bits, such that the most significant, or index bits, remain. For each sample, the value of an individual one of the masked bits is examined by comparing it with a corresponding entry in a mask array to determine whether the index bits are to be incremented prior to being used as an index to the lookup table. The mask array defines a dithering process whereby different masked bits are examined for different samples, resulting in dithered quantized index bits for the samples, that when used to access the lookup table, yield an average result over a neighborhood of samples that approximates the result that could be obtained using linear interpolation.

17 Claims, 12 Drawing Sheets

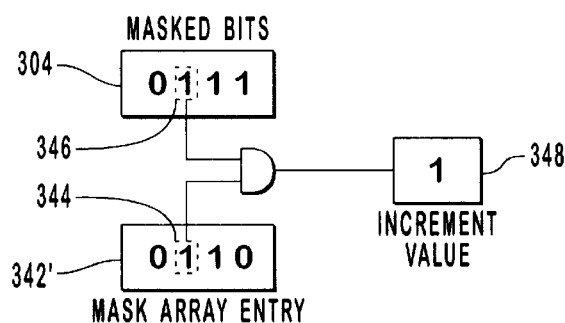
|  | C1 | C2 | C3 | C4 |
|---|---|---|---|---|
| R1 | 1000 | 0100 | 1000 | 0010 |
| R2 | 0100 | 1000 | 0001 | 1000 |
| R3 | 1000 | 0010 | 1000 | 0100 |
| R4 | 0000 | 1000 | 0100 | 1000 |
MASK ARRAY
FIG. 10A
FIG. 10B
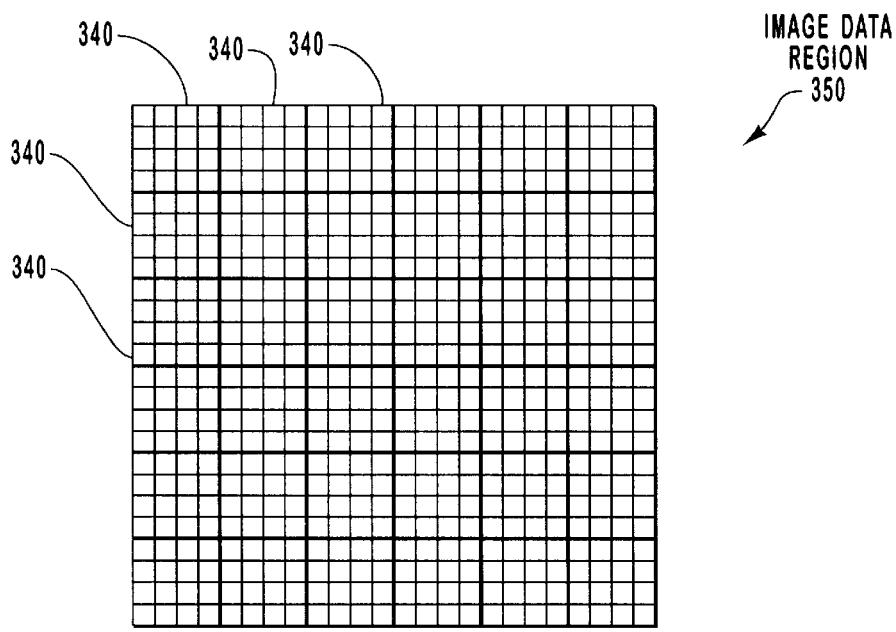
FIG. 10C

| 100 | 010 | 100 | 001 |
|-----|-----|-----|-----|
| 000 | 100 | 010 | 100 |

MASK ARRAY 400

| 10 | 00 |
|----|----|
| 01 | 10 |

MASK ARRAY 450

| 1 | 0 |
|---|---|

MASK ARRAY 460

MASK ARRAY 470

FIG. 17

DITHERED QUANTIZATION USING NEIGHBORHOOD MASK ARRAY TO APPROXIMATE INTERPOLATE

BACKGROUND OF THE INVENTION

1. The Field of the Invention

The present invention relates to data mapping using a sparse lookup table in a manner that approximates linear interpolation. More specifically, the present invention relates to mapping of data by quantizing data samples and accessing a lookup table such that the average of the output data for a neighborhood of samples converges to a result that is comparable with or approximates the result that would have been obtained using linear interpolation.

2. The Prior State of the Art

Printing an image using a computer printer or another image forming system often involves processing color image data by converting the image data from a first color space to a second color space. For example, image data is often stored or received by a computer in a red, green, blue ("RGB") format, while many computer printers utilize a cyan, magenta, yellow ("CMY") or cyan, magenta, yellow, black ("CMYK") format. Such formats are examples of image data that can exist in any number of color spaces. The process of converting color image data from a first color space to a second color space represents but one example of a general mathematical problem of evaluating a multivariable function given specific values of the input variables.

There exist several techniques for converting image data from a first color space to a second color space. In practice, image data typically includes a plurality of samples, each being represented by multiple values associated with the different color components in a color space. For example, each sample of RGB data includes a red component, a green component, and a blue component. One approach for converting such RGB image data to CMY data uses a set of three equations defining C, M and Y as linear functions of R, G, and B. Assuming the R, G, and B components of the image data are represented by eight bits of data, in which case the intensity of each of the three components has a value between 0 and 255, the linear approach for converting RGB to CMY can be defined as C=255−R; M=255−G; Y=255−B. This approach is relatively computationally efficient, since each sample can be converted by performing only three calculations, none of which is a division operation. However, in practice, this direct approach introduces unacceptable errors because the available colorants used in image forming systems do not behave in the linear fashion described in the foregoing equations.

A second technique is to obtain a set of higher order polynomials that define CMY(K) as functions of RGB. This analytic method can reduce errors, since it can more closely approximate the actual behavior of specific colorants that are used in image forming systems. However, as the analytic polynomials are taken to higher orders, the number of calculations per sample increases. Moreover, any set of higher order polynomials are adapted only to a specific set of colorants, and any change in the colorants and the associated color conversion functions would require a new set of polynomials.

FIG. 1 graphically illustrates the technique for directly calculating the value of a function, f(x), based on the known value of x. Conceptually, FIG. 1 represents the conversion method that uses a set of higher order polynomials to convert image data from a first color space to a second color space, although FIG. 1 illustrates the problem in only one dimension, whereas RGB to CMY(K) conversion requires a three-dimensional solution. In FIG. 1, the known value of x can be used to directly calculate the value of f(x) (shown at 10) to any desired degree of accuracy that is limited only by the degree of the polynomial function and by the computing resources dedicated to the process.

The two foregoing techniques for converting image data from a first color space to a second color space involve direct calculation of values in the second color space using functions that are defined with any desire degree of accuracy. Other methods for converting image data from first color space to a second color space involve lookup tables in which the values of CMY(K) as a function of RGB are pre-calculated and stored for use during the conversion process. The lookup table eliminates direct calculation of the color values at runtime, but requires memory to be accessed for each sample. A lookup table used for converting RGB to CMY(K) can be described as having three dimensions, that when fully populated, has 16,777,216 entries (e.g., 256× 256×256), assuming eight bit values for each of the RGB components of the image data, which also corresponds to the number of colors that can be defined by such image data. As can be readily understood, a fully populated lookup table can require a prohibitive amount of memory. Although a fully populated lookup table can yield results having any desired degree of accuracy, the memory and computational requirements make them impractical in most image forming systems.

These memory and computational requirements can be reduced using a sparsely populated lookup table that includes entries for fewer than all of the possible combinations of RGB values. Empirically, it has been found that the curvature of the color conversion functions can be adequately approximated by using a lookup table having 17 lattice points for each color dimension. This technique requires a lookup table having fewer than 5,000 entries.

FIG. 2A illustrates the conversion function of FIG. 1 having been defined by a series of discrete points 12 that can be used in a lookup table, as opposed to being defined by a continuous curve. FIG. 2B conceptually illustrates a sparsely populated lookup table 20 having three dimensions that can be used to convert image data from a first color space (e.g., RGB) to a second color space (e.g., CMY(K)). Only some of the data points 22 defined in lookup table 20 are illustrated in FIG. 2B for purposes of clarity. In a fully populated lookup table, each possible sample, represented by eight bit values of R, G, and B would map to a single point in a lookup table, which in turn would correspond to a set of CMY(K) values. In the sparse lookup table 20, only a relatively small number of values of R, G and B map directly to a lattice points 22. Those samples that map directly to a lattice point 22 yield the corresponding CMY(K) values associated with the lattice point. The vast majority of RGB values, however, map to a position in the sparsely populated lookup table that does not coincide with a lattice point. In order to evaluate the conversion functions for such samples of image data, a method of approximating the value of the conversion functions is used.

One conventional way of approximating the value of the conversion functions involves truncating specified numbers of bits from the RGB values to obtain index values that map directly to lattice points in the sparsely populated lookup table. For purposes of illustration, the analogous one dimensional truncation technique is illustrated in FIG. 3, in which the value of f(x) is to be approximated based on the known value of x. In FIG. 3 it is assumed that the input data defines x with eight bits of accuracy, while f(x) has been defined at 17 discrete points, each of which corresponds to an entry in a lookup table. Truncation of the eight bit input data by four bits results in quantized input data including the four most significant bits, which can be mapped to one of the lookup table entries as shown by the stairstep pattern 30a. Truncation in this matter effectively results in the values of the input data being rounded down to the next entry of the lookup table. For example, input data having a value of 127 (0111 1111) when truncated indexes the same lookup table entry and yields the same output data as an input value of 96 (0111 0000). Accordingly, the samples are quantized, meaning that the same output value is generated for a range of input values.

In an image forming system, such as a computer printer, the result can be a color artifact known as contour bands, which are same-colored stripes or regions on the rendered image. contour banding can be observed when the number of discrete output values is sufficiently small that the difference between successive values can be perceived by the human eye, which is typically the case for RGB lookup tables having only 17 lattice points in each dimension. Moreover, the maximum error at an individual sample (e.g. one at an edge of a contour band, or 127 in the example of FIG. 3) using this truncation technique is almost as great as the difference in the value of the function at adjacent lattice points. There is also generally an overall error, as can be seen in FIG. 3, in which the average evaluation of f(x) is too low due to the positive slope of f(x).

The maximum error for any sample and the overall error can be reduced by combining the truncation operation with a rounding operation, whereby the truncated values are rounded to the nearest lookup table entry rather than being always rounded down. As a result, the stairstep pattern 30b is shifted to the left as shown in FIG. 3 and the maximum error for any given sample is reduced by approximately a factor of 2, although any contour banding artifacts remain. Either of the foregoing approximation techniques are relatively computationally efficient, in that they involve only truncation and, optionally, rounding, operations and a single lookup table access per sample. The significant drawbacks of this method, however, include noticeable contour bands that can be introduced into the rendered image, errors at individual samples and overall errors.

Linear interpolation rather than truncation or rounding can be used to significantly reduce the local and overall errors that otherwise are associated with the use of sparsely populated lookup tables. FIG. 4 graphically represents conventional one-dimensional linear interpolation, which will be well understood by those skilled in the art. Points A and B represent lattice points or entries in a lookup table and f(A) and f(B) represent the known values of the conversion function at A and B. Linear interpolation assumes that f(x) is linear in the region between points A and B, which assumption enables the approximation of f(x) to be readily calculated. Linear interpolation in one dimension as illustrated in FIG. 4 is relatively straightforward and computationally efficient. However, as the number of dimensions of the conversion function increases to two and particularly three or more variables or dimensions, the complexity of the linear interpolation problem increases exponentially.

Three dimensional linear interpolation, such as that which has been used in association with sparsely populated lookup tables to convert RGB image data to CYM(K) data, involves a significant number of lookup table accesses and calculations per sample. In general, linear interpolation requires the sample to be bounded by a sufficient number of points that allows interpolation to be conducted. In the three dimensional problem, trilinear interpolation can be performed by selecting the eight lattice points that define a cube or a rectangular region that contains the sample. Other three dimensional linear interpolation techniques have been developed, including tetrahedral trilinear interpolation that selects only four points defining a tetrahedron that encloses the sample. However, the tradeoffs for tetrahedral interpolation include identifying which of the multiple available lattice points should be selected as vertices of the tetrahedron that bounds the sample. In any case, trilinear interpolation requires multiple accesses of the lookup table (as many as eight) for each sample and also requires a number of calculations per sample to complete the interpolation process.

In addition to these interpolation techniques, there have been developed other approaches for identifying the converted image data values to be applied to samples using sparsely populated lookup tables. For example, U.S. Pat. No. 5,377,041 to Spaulding, et al. discloses a process of applying a spatial modulation to input color values prior to quantizing the color values. The spatial modulation is disclosed by Spaulding as being local mean-preserving and it introduces variation into the input color values such that successive instances of a specific color value can result in different quantized values.

The foregoing methods for calculating or approximating the value of a function either suffer from computational complexity, frequent access of lookup tables, prohibitive memory requirements, or local or overall errors and associated color artifacts. In view of the foregoing, there is a need for methods and systems for evaluating or approximating the value of a function using a sparsely populated lookup table while avoiding the problems associated with prior art methods.

SUMMARY OF THE INVENTION

The present invention relates to approximating the value of a function using a sparsely populated lookup table and known values, or samples, of input data. In one implementation, the invention can be used to perform a color conversion operation on image data in printers or other image forming systems. Rather than performing linear interpolation for samples of the data, the methods of the invention involve a dithered quantization of the samples prior to using the samples as indices to the lookup table. Although the dithered quantization introduces local errors at individual samples, the output data generated for a neighborhood of samples approximates, or converges to, the output data that could be obtained using conventional linear interpolation.

One significant advantage of the methods of the invention is that as few as one lookup table access per sample can be performed because of the quantization of the samples. In contrast, conventional tetrahedral trilinear interpolation requires at least four lookup table accesses for samples that do not coincide with lattice points of the lookup table, while other trilinear interpolation procedures require eight lookup table accesses per sample. Although local errors are introduced by the quantization operations of the invention, the approximation of the output data that could be obtained using conventional linear interpolation is generally acceptable, particularly in environments where the sample density is great enough such that the local errors are imperceptible. For instance, the invention can be practiced in image forming systems, such as printers, in which the pixel density is high enough that the human eye does not readily perceive color differences between individual pixels, but only between neighborhoods of pixels.

Dithered quantization according to the invention refers to a process of truncating a selected number of bits from a sample, such that only a set of most significant bits remains. The most significant bits, or index bits, are used as an index to the lookup table, but only after the least significant bits of the sample (i.e., the bits that have been truncated) are analyzed to determine whether the most significant bits of the particular sample should be incremented by a value of one. Over a neighborhood of samples, the index bits are incremented at a frequency that approximates linear interpolation. For instance, if a sample falls in a lookup table between adjacent lattice points at a position such that the lattice point having the greater value would be weighted more in conventional linear interpolation, the index bits of a neighborhood of such samples would be incremented by one at a correspondingly high frequency. Thus, although individual quantized samples introduce local errors, the average output data for a neighborhood of samples approximates or converges to the output data that could be obtained using conventional linear interpolation.

The dithered quantization operations of the invention differ from conventional quantization techniques in that the dithered quantization operations of the invention result in output data that approximates the results that could be obtained using conventional linear interpolation and minimizes the overall error for a neighborhood of samples. In contrast, conventional quantization can involve adjusting the value of successive identical samples to an adjacent lattice point, thereby introducing the same local error in each of a neighborhood of samples. It has been noted that this property of conventional quantization introduces artifacts such as contour banding, which is eliminated using the dithered quantization operations of the invention.

One technique for efficiently determining whether the index bits (i.e., the most significant bits) should be incremented by one prior to indexing the lookup table involves use of a mask array that is tiled over the data and has one entry per sample. The least significant bits of the sample are compared with the corresponding entry of the mask array to determine whether the value of the least significant bits (i.e., the bits that have been truncated from the index bits) indicates that the associated index bits are to be incremented. The entries of the mask array are selected and arranged based on the observation that the bits that have been truncated from the index bits are informative of the position of the sample relative to the adjacent lattice points of the lookup table in proportion to the significance of these bits. In other words, the mask array is constructed to give proportionally more weight to the more significant bits and proportionally less weight to the less significant bits when determining how frequently the index bits of a neighborhood of samples should be incremented prior to indexing the lookup table.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which:

FIG. 10A depicts a mask array constructed to analyze the masked bits of samples in a neighborhood to determine whether or not to increment the corresponding index bits prior to indexing a lattice point in the sparse lookup table.

FIG. 10B illustrates a logical AND operation performed with the bit having a value of one in an entry of a mask array and the corresponding bit in the masked bits of a sample.

FIG. 10C illustrates the mask array of FIG. 10A being tiled over a region of image data.

FIG. 17 illustrates a method of using shift arrays to represent mask arrays.

DETAILED DESCRIPTION OF THE INVENTION

Figure 1:
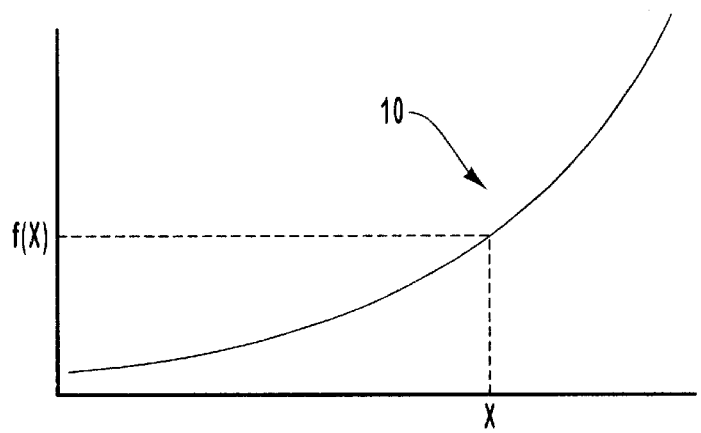
FIG. 1 graphically represents a process of directly calculating the values of a function based on known values of the input variables.
Figure 2A:
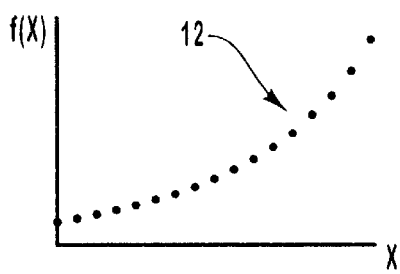
FIG. 2A graphically represents the function of FIG. 1 having been evaluated at discrete points, which can be used to construct a lookup table for evaluating the function.
Figure 2B:
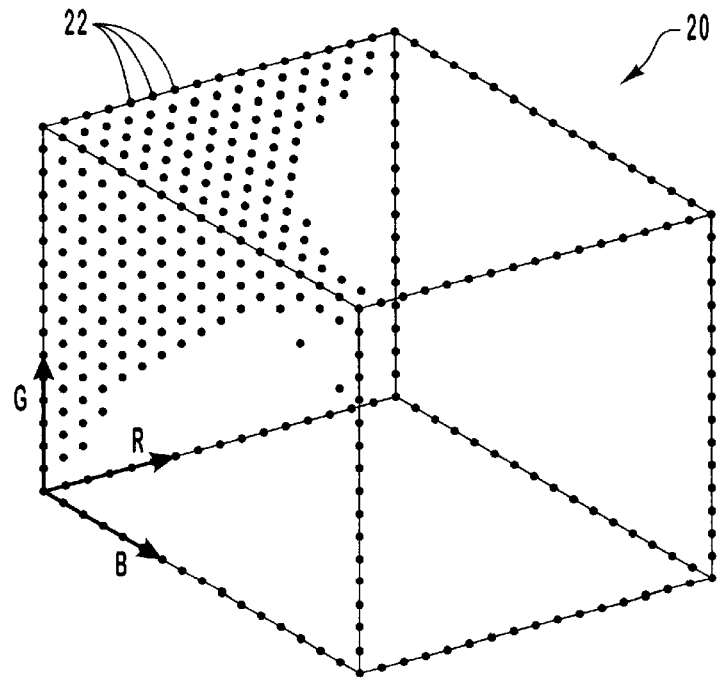
FIG. 2B graphically illustrates a sparsely populated three-dimensional lookup table that can be used to evaluate a function having three variables based on known input values.
Figure 3:
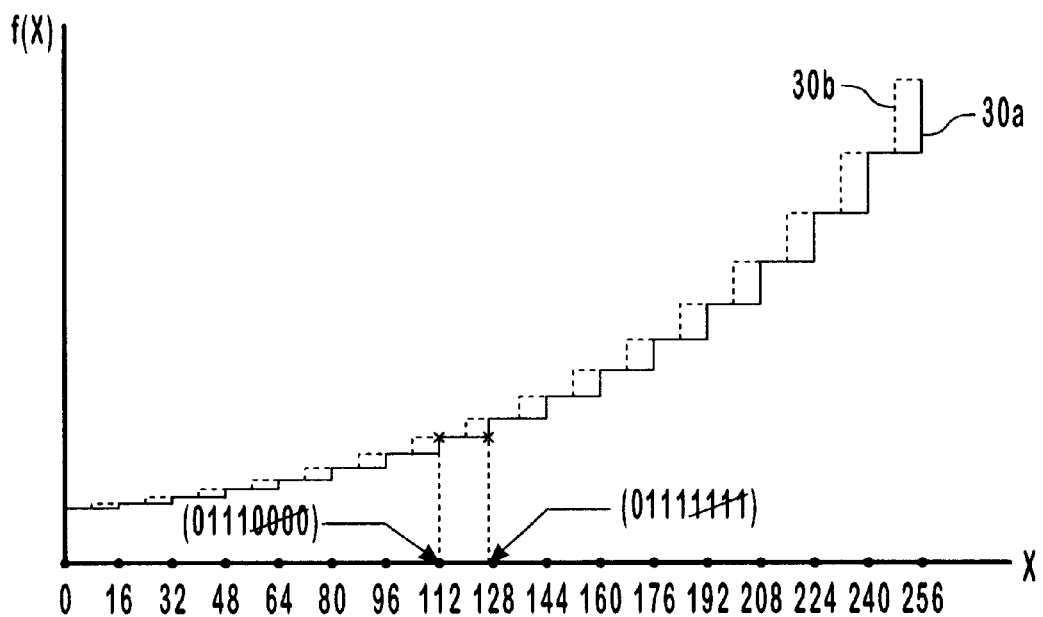
FIG. 3 graphically depicts conventional techniques for evaluating a function using a sparsely populated lookup table using quantization of samples, either with or without rounding to the nearest lattice point.
Figure 4:
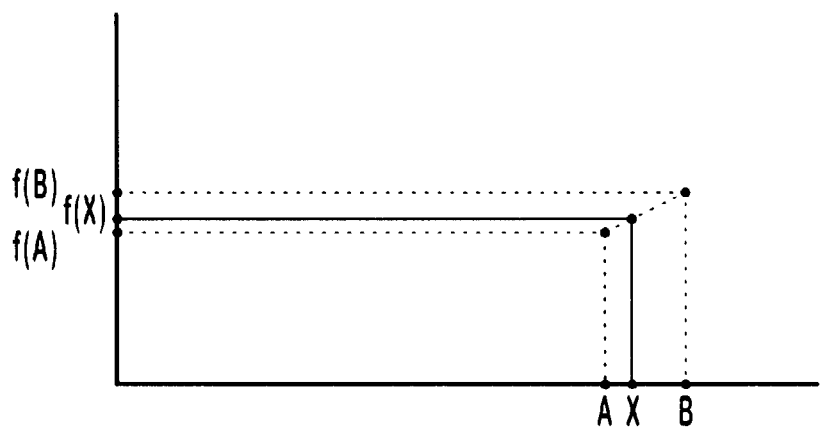
FIG. 4 graphically represents conventional one-dimensional linear interpolation.

The present invention relates to systems and methods for using a lookup table to approximate the value of a function, which may have multiple variables. In one embodiment, the invention is practiced with image forming systems to convert image data from a first color space to a second color space. The invention will be primarily described herein in the context of performing color conversion operations, but those skilled in the art, upon learning of the disclosure made herein, will recognize that the invention extends to other systems in which output data is to be derived using input data and a sparsely populated lookup table.

Rather than performing multilinear interpolation, the methods and systems of the invention involve dithered quantization of data samples with the quantized samples being used as indices to the sparsely populated lookup table. Successive samples in a neighborhood are quantized and adjusted either up or down to the nearest lattice point of the lookup table, such that the average of the output generated for a neighborhood of samples approximates or approaches the output that would be generated using multilinear interpolation. The determination as to whether a specific sample is to be adjusted up or down as part of the quantization process can be made by processing the least significant bits of the sample with a corresponding entry in a mask array.

Prior to describing the accompanying figures, the following definitions of terms used in the description and the claims are presented. The terms "sparse lookup table" and "sparsely populated lookup table" are interchangeable and refer to data structures that can be used to calculate or approximate the value of a function based on given values of input variables, and which have entries for fewer than all combinations of possible values of the input variables. Conceptually, such sparse lookup tables have a number of dimensions equal to the number of independent input variables of the function.

The term "lattice point" refers to an entry in a sparse lookup table at which the value of the function is defined for specified values of the input variables.

The term "sample" refers to a point or region of the input data at which the input variables are specified, and for which the function associated with the lookup table is to be evaluated.

The term "neighborhood" refers to a set of samples that are adjacent or near one to another in, for example, the spatial domain or the time domain. The sample neighborhood can be in a 2-dimensional space for static color conversion in printers; in the time domain for other control or conversion applications, such as automotive ignition spark advance and fuel injection metering; in a combination of space and time for rasterizing video displays; or scalars (e.g., distance traveled) in fuel consumption calculations.

The term "mask array" refers to an array having entries that are used to evaluate whether the most significant bits of a sample are to be incremented prior to using the most significant bits as an index to a sparse lookup table. General principles and specific examples of mask arrays are disclosed in greater detail below.

The term "color space" refers to a system or model for defining the color attributes of samples of image data. Examples of color spaces include RGB, CMY, CMYK, and YUV, although the invention can be practiced with any desired color spaces.

The term "image forming system" refers to any system or apparatus that can be used to display, print, render, or generate an image based on image data. Examples of image forming systems include, but are not limited to facsimile machines; photocopiers; and printers, such as laser, LED, and LCD printers, ink jet printers, and dot matrix printers. The invention extends to image forming systems that are configured to perform color conversion operations according to the principles described herein and to methods of performing color conversion operations in such image forming systems. The foregoing printers include those that have the processing capabilities to perform the dithered quantization operations of the invention and those that use "host-based" controllers to provide the input to a printer that lacks its own processor. A host-based controller can be defined as a computer that controls an associated printer or the software, hardware, or a combination of software and hardware in the computer that controls the printer. Host-based controllers, therefore, represent another example of image forming systems in which the invention can be practiced. Display devices are also included in the definition of "image forming system". For instance, LCD or color plasma display devices can require color conversion operations of RGB image data, and the invention can be practiced with such display devices.

I. Exemplary Operating Environment

Embodiments within the scope of the present invention include computer-readable media comprising computer-executable instructions and/or data structures for performing various functions. Such computer-readable media and data storage means can be any available media that can be accessed by a processor included in an image forming system. By way of example, and not limitation, such computer-readable media and data storage means can comprise RAM, ROM, EEPROM, CD-ROM or other optical disk storage, magnetic disk storage or other magnetic storage devices, or any other medium which can be used to store executable instructions and/or data and which can be accessed by a processor included in an image forming system.

When information is transferred or provided over a network or other communications connection to a printer or another image forming system, the connection can accurately be described as a computer-readable medium. Combinations of the foregoing structures are also included within the scope of computer-readable media, and a single computer-readable medium, as used in the claims, can include more than one of the foregoing structures. Computer-executable instructions comprise, for example, instructions and data which cause a processor included in an image forming system to perform a certain function or group of functions. The computer-executable instructions and associated data structures represent an example of program code means for executing the steps of the invention disclosed herein.

The invention will be described in the general context of computer-executable instructions, such as program modules, being executed by a processor included in an image forming system. Generally, program modules include routines, programs, objects, components, data structures, or the like that perform particular tasks or implement particular abstract data types. The invention may also be practiced in distributed computing environments where tasks are performed by remote processing devices that are linked through a communications network. In a distributed computing environment, program modules may be located in both local and remote memory storage devices. The components of the foregoing computer systems that perform the computer-executable instructions are examples of processor means used in practicing the present invention. In distributed computing environments, when all or part of the data mapping operations of the invention are performed remotely from a printer or other apparatus that can form images, the networked computers are considered to be part of the image forming system.

Figure 5:
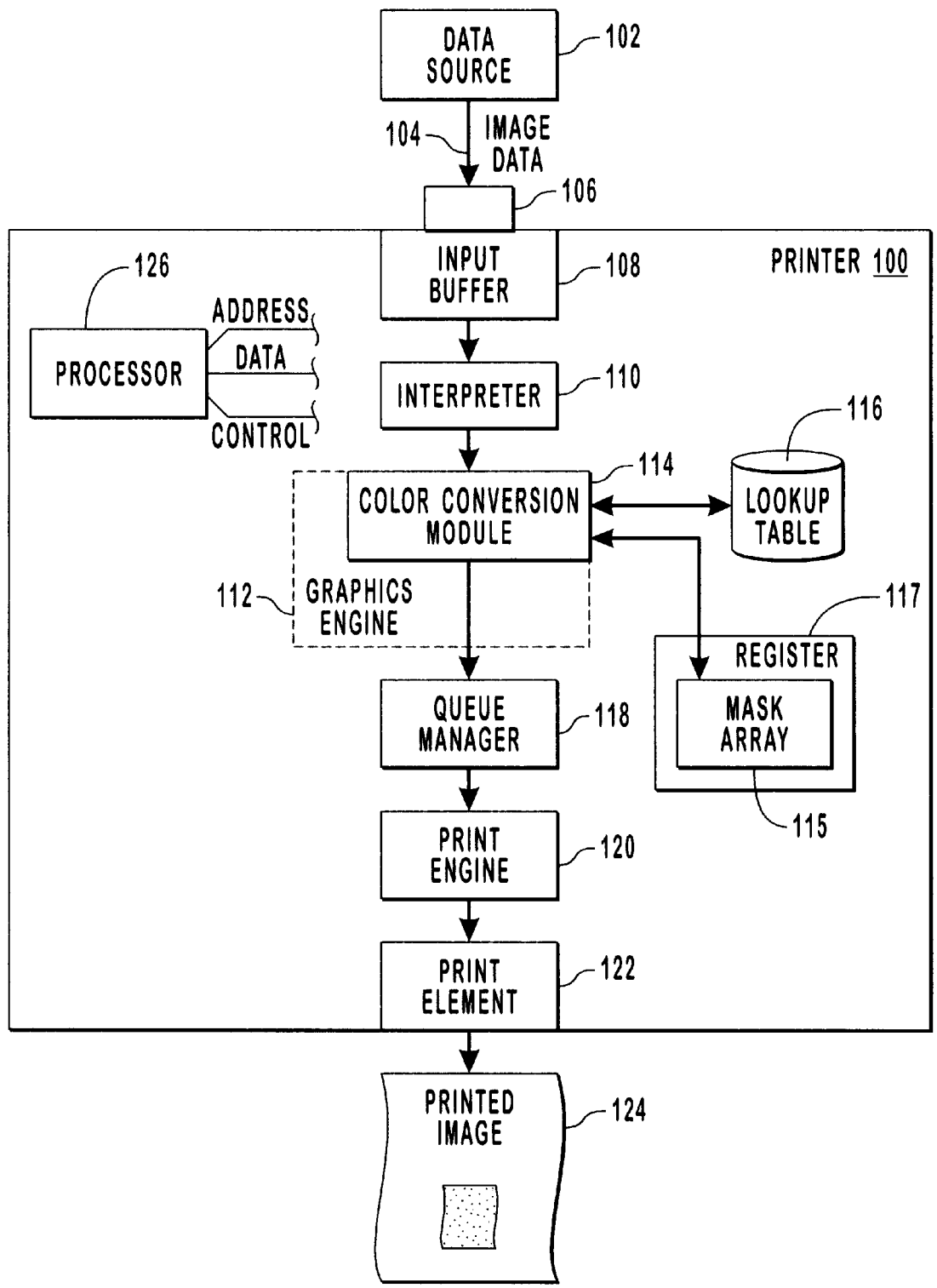
FIG. 5 is a block diagram depicting a printer, which represents one example of an image forming system that can be used with the invention.

FIG. 5 illustrates a printer 100, which represents one example of an image forming system that embodies the invention or in which the invention can be practiced. Software such as a word processor, an internet browser, or the like operates at data source 102 and generates image data 104. Data source 102 may be a personal computer, a workstation, a special purpose computer, or any other system that can generate or provide the image data 104. Image data 104 is transmitted from data source 102 to printer 100 by means of a port 106 which may be a serial port, a parallel port, or a port that includes any appropriate connector for communicating with data source 102. Image data 104 is received by input buffer 108, which manages the flow of image data to the other processing components of printer 100. The image data is transmitted from input buffer 108 to one or more interpreters 110. One common interpreter is PostScript™, which is an industry standard used by many laser printers.

The interpreted image data is then sent to a graphics engine 112 for rasterization, color conversion, and other graphics operations as needed. Graphics engine 112 includes a color conversion module 114 which, in combination with lookup table 116, performs color conversion operations according to the principles disclosed herein. For instance, color conversion module 114 can apply a conversion function to the image data to convert it from a first color space in which it was expressed by data source 102 to a second color space that is compatible with the colorants used by printer 100. For instance, a common color conversion operation is the conversion from RGB to CMY(K) although the invention extends to other color conversion operations. In order to perform the conversion operations of the invention, printer 100 also has stored therein a mask array 115, which is used to determine whether a quantized sample is to be incremented prior to being used as an index to lookup table 116. Mask array 115 can be stored in any structure for storing data. In one embodiment, mask array 115 is expressed in terms of a shift array, which will be further described herein, and stored in register 117.

While FIG. 5 illustrates the color conversion operations being performed at printer 100, the color conversion operations can alternatively be performed at data source 102 prior to the image data being transmitted to printer 100. For instance, a personal computer linked with printer 100 can be adapted for performing the color conversion operations of the invention. When the color conversion operations are performed at data source 102, data source 102 is properly understood to be included in the image forming system.

Once rasterization and color conversion are performed, the image data is transmitted to a queue manager 118 and is stored there in a format that specifies the amount of colorant to be applied for each pixel in preparation for the associated image to be printed in hard copy. Queue manager 118 transmits the image data to print engine 120, which then sends the image data in a serialized format to print element 122. The print element uses colorants to physically render the image associated with the image data as printed image 124 on a print medium.

Processor 126, having address lines, data lines, and control and/or interrupt lines, controls the various components of printer 100 and provides computing resources used for processing image data and performing the color conversion operations of the invention. Printer 100 also has any other components, which will be understood by those skilled in the art. In general, printer 100 can be any conventional printer that has been adapted to perform the color conversion operations disclosed herein.

II. Dithered Quantization to Approximate Interpolation

Figure 6:
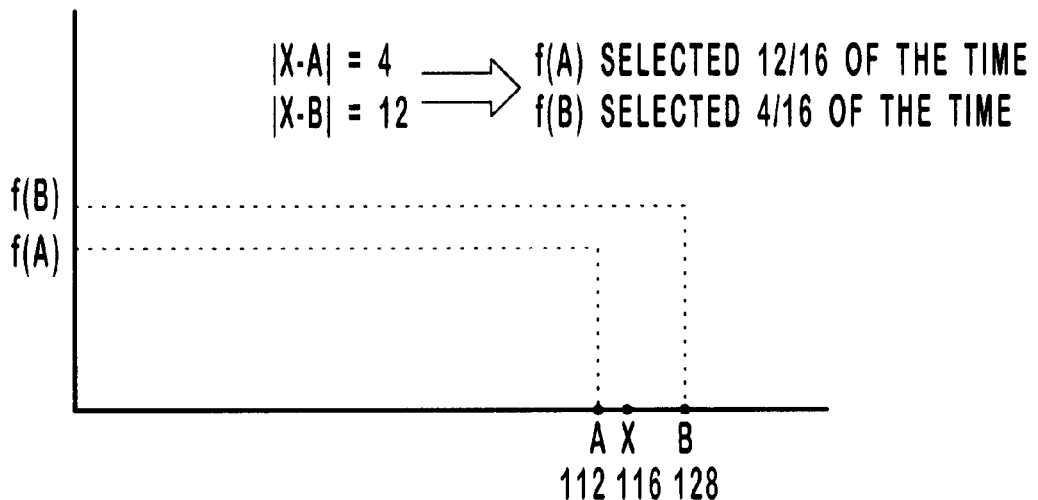
FIG. 6 graphically illustrates a sample falling between adjacent lattice points in a one-dimensional lookup table and illustrates how samples from a neighborhood are selectively quantized to one of the two adjacent lattice points according to the invention.

As noted previously, embodiments of the present invention relate to converting samples of image data from a first color space to a second color space using techniques that, over a neighborhood of adjacent samples, approximate or approach the result that would be obtained by using linear interpolation. FIG. 6 graphically illustrates in one dimension the data conversion techniques according to the invention. While FIG. 6 illustrates the process only in one dimension, the concepts are readily applicable to three dimensions, as will be described in greater detail below. As shown in FIG. 6, a sample x has a value that falls between two adjacent entries in the lookup table, A and B. Individual instances, or samples, of x are quantized by adjusting the value x either down to value A or up to value B, resulting in f(A) or f(B) being generated for particular samples. Assuming a neighborhood of samples x are processed, the relative frequency at which the samples x are adjusted to A and to B is inversely proportional to the ratio of the distance between x and A and the distance between x and B. In this sense, the samples are processed by "dithered quantization", meaning that successive samples can be quantized to different values. As a result, when a neighborhood of samples having the value x are processed according to the invention, the neighborhood average of the output data (i.e., f(x)) approaches the value that would be obtained by performing linear interpolation on each sample. It is noted that the neighborhood average approaches the output value that could be obtained by interpolation even though individual samples are quantized to either f(A) or f(B).

In a specific example, assume A has a value of 112 (0111 0000) and B has a value of 128 (1000 0000). In this example, x is assumed to have a value of 116 (0111 0100). As can be seen in FIG. 6, the ratio between the distances from x to A and the distance from x to B is 1:3. Accordingly, for a neighborhood of samples having the value of x, the value f(A) is selected at a rate of 3:1 with respect to the rate at which the value f(B) is selected. In other words, f(A) is selected 75% of the time, whereas f(B) is selected 25% of the time. Again, although each sample has an error introduced by the quantization process, the average of the output values of the neighborhood approaches the result that would be obtained by performing linear interpolation for each sample.

A significant benefit of performing the conversion processes according to the invention is that the lookup table is accessed only once per sample as opposed to being accessed multiple times using linear interpolation techniques. This advantage is particularly pronounced when it is applied to lookup tables having three or more dimensions, such as those used to convert RGB image data to CMY(K) image data. Rather than accessing the lookup table at least four times, or as many as eight times, for each sample that does not coincide with a lattice point, the lookup table is accessed only once per sample. Embodiments that access the lookup table more frequently than once per sample are disclosed in greater detail below.

Quantization, both in the prior art and according to the invention, generally includes a truncation operation whereby the least significant bits are removed from the input data sample. The inventor has observed that the relative position of x with respect to A and B in FIG. 6 can be determined by examining the bits that have been truncated from the input data. Moreover, the inventor has observed that the individual bits included in the bits that are removed from the sample become increasingly less informative regarding the position of x as the bits become less significant. In view of these observations, embodiments of the invention involve analyzing the bits that have been removed to determine whether or not to increment the bits that remain after truncation prior to using the remaining bits as indices to the lookup table. In a preferred embodiment of the invention, this determination is made by comparing the truncated bits with a specified entry of a mask array that results in the remaining bits being incremented at a frequency that is related to the position of the input data with respect to the adjacent lattice points as has been previously described. The details of the mask arrays of the invention and their use will be described in further detail hereinbelow.

Figure 7:
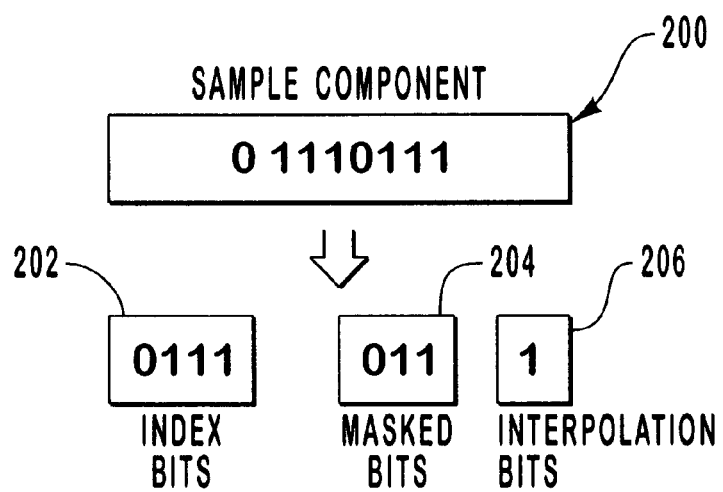
FIG. 7 illustrates a general case of truncating or dividing an eight-bit component of a sample into one or more index bits, zero or more masked bits, and zero or more interpolation bits.

As indicated above, the process of determining whether a particular sample is to be adjusted up or down prior to being used as an index to the lookup table can be performed by analyzing bits that have been truncated from the sample. FIG. 7 illustrates one eight-bit component of a input data sample that is truncated or separated into subsets of bits. Furthermore, FIG. 7 presents terminology used herein to describe the dithered quantization operations of the invention. As shown in FIG. 7, component 200 includes eight bits. In cases where the data samples represent color image data, the component 200 can represent one of three color components of the sample. During the data mapping processes, different sets of bits included in component 200 are used in different operations. These sets of bits include one or more index bits 202, zero or more masked bits 204, and zero or more interpolation bits 206.

Index bits 202 are the most significant bits of component 200, and are those that can be used as an index to a lattice point of the corresponding sparse lookup table. In the example of FIG. 7, the number of bits included in index bits 202 is selected to specify a particular lattice point, without including additional information. Four index bits 202 could be used in cases where the sparse lookup table has 17 lattice points in the dimension associated with the component 200 of the sample. The remaining bits, namely masked bits 204 and interpolation bits 206, are those that are truncated from sample 200 during runtime. Masked bits 204 are those that are to be processed using the mask arrays of the invention to determine whether index bits 202 are to be incremented prior to being used as an index to the lookup table. As noted previously, the information included in masked bits 204 indicate the relative position of the sample between the two nearest lattice points of the lookup table. Finally, in embodiments where at least one interpolation bit 206 exist, the interpolation bits are used to perform interpolation operations in addition to the quantization operations of the invention as will be discussed in more detail below. Interpolation bits are to be understood as a subset, or special case, of masked bits.

In order to clearly describe the operation of the invention, a specific example of color conversion using four index bits, four masked bits, and zero interpolation bits will be described, followed by further description that generalizes this specific example for use with techniques having any number of index bits, masked bits, and interpolation bits.

Figures 8A, 8B, 9:
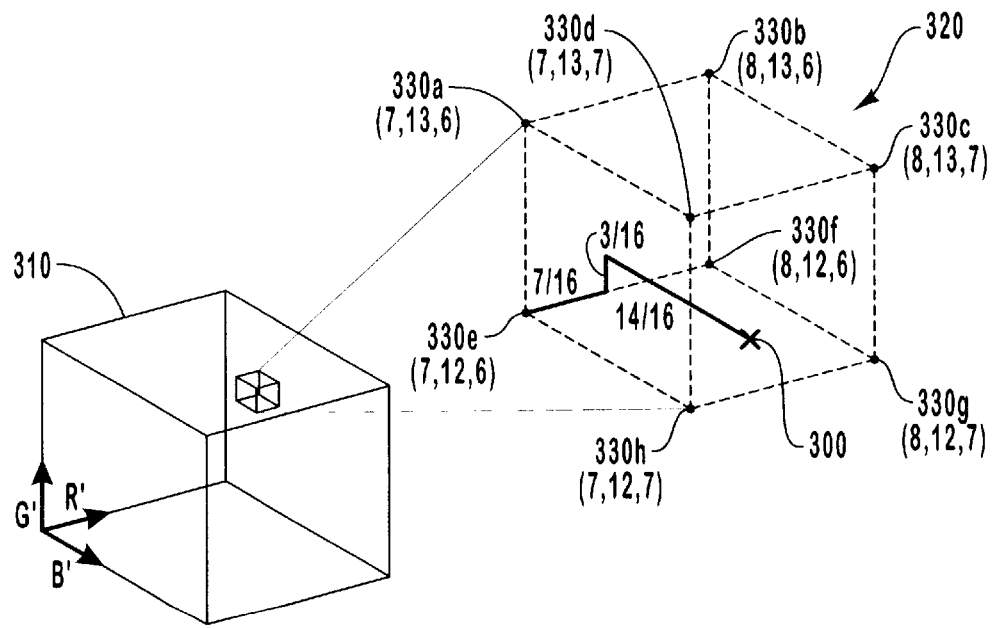
FIG. 8A illustrates a specific example of an RGB sample.
FIG. 8B illustrates the RGB sample of FIG. 8A having been truncated, resulting in four index bits and four masked bits.
FIG. 9 graphically represents the position of the sample of FIG. 8A superimposed onto a three-dimensional sparsely populated lookup table.

FIG. 8A represents one sample 300 of image data expressed in terms of RGB that will be converted to a second color space. Also shown in FIG. 8A are the equivilant RGB values expressed in base 10 numbers on a scale from 0 to 255. In this example, the lookup table has 17 lattice points per dimension. The number 17 is commonly selected for use with such sparse lookup tables because it has been found that 17 points generally adequately approximates the curvature of the color conversion function, results in $2^4$ segments between lattice points in each dimension and has a lattice point at the midpoint of each color dimension.

FIG. 8B shows the sample of image data of FIG. 8A after the four least significant bits (i.e., four masked bits 304) for each of the RGB components have been truncated, resulting in the four most significant bits (i.e., index bits 302) for each color component remaining. Truncating the values for RGB in this manner results in the remaining bits being sufficient to map to lattice points in the sparse lookup table without any unnecessary bits remaining. As shown at FIG. 8B, the index bits 302 correspond to a lattice point in the lookup table having coordinates (7, 12, 6) in a scale of 0–16. The masked bits 304, which have been truncated from index bits 302, are to be used as will be further described herein to determine whether or not index bits 302 are to be incremented by a value of one prior to being used to index the lookup table.

FIG. 9 graphically depicts the sparse lookup table 310 having R', G', and B' dimensions and illustrates in detail the cubic region 320 of lookup table 310 defined by the eight lattice points 330a–h, which bound the sample specified by the image data of FIG. 8A. In particular, sample 300 is positioned at a location $7/16^{th}$ of the distance between points 330e and 330f in the R' direction, $14/16^{th}$ of the distance between points 330e and 330a in the G' direction and $14/16^{th}$ of the distance between points 330e and 330h in the B' direction. Sample 300 has a position that is intermediate with respect to the lower and higher adjacent lattice points. For instance, any of lattice points 330a, d, e, and h are designated as "lower adjacent" lattice points and any of lattice points 330b, c, f, and g are designated as "higher adjacent" lattice points with respect to the red R' component of sample 300. A different set of lattice points is designated as lower adjacent and higher adjacent lattice points for different dimensions of lookup table 310.

Rather than performing trilinear interpolation on sample 300 using the lattice points 330a–h shown in FIG. 9, sample 300 is quantized to one of the eight lattice points 330a–h by a process of truncation and selectively incrementing or not incrementing the index bits 302 by a value of one. Because successive samples in a neighborhood are adjusted to different lattice points selected from lattice points 330a–h based on the relative position of sample 300 with respect to the lattice points, the values generated for the neighborhood of samples 300 approach the result that would have been generated using trilinear interpolation. It is also noted that the least significant bits (i.e., masked bits 304) of FIG. 8B that are truncated from index bits 302 represent the relative position of sample 300 with respect to the eight lattice points 330a–h of FIG. 9.

For purposes of describing how the decision for any particular sample 300 can be made regarding whether or not to increment the index bits 302, the following discussion will be presented in terms of the R' dimension of sparse lookup table 310. However, it should be understood that the same process is applied to the other dimensions, namely, G' and B', of lookup table 310 to identify the lattice point used for converting sample 300 to the value expressed in the second color space. FIG. 10A illustrates a mask array 340 having columns C1–C4 and rows R1–R4. Each entry, for example one of entries 342, corresponds to a single sample of the image data. Mask array 340 is typically tiled over the image data that is to be converted as shown in FIG. 10C, which illustrates a region 350 of the image data having dimensions of 24 samples by 24 samples. Together, FIGS. 10A and 10C illustrate how each sample of the image data corresponds to a single entry of a mask array 340.

The contents of entries 342 of mask array 340 represent a heuristic discovered by the inventor, which efficiently allows the truncated masked bits of each sample to be examined to determine whether or not the remaining index bits should be incremented by one prior to using the index bits to access the lookup table. The following discussion presents the general technique of using a mask array to determine whether index bits are to be incremented prior to accessing the lookup table, and this discussion is applicable to the present example and to all other examples described herein unless otherwise indicated. It is first noted that each entry 342, with the exception of entry (0000), includes one and only one bit having the value of one. Moreover, each sample that is processed in the color conversion operations of the invention is located at a position in the image data that corresponds to a particular entry 342.

As shown in FIG. 10B, the determination as to whether the index bits should be incremented is performed by logically ANDing the "1" bit 344 in an entry 342 in mask array 340 with the bit 346 having the same bit position in the masked bits 304 of the corresponding sample. If bit 346 also has a value of one, which is the case in the example of FIG. 10B, the AND operation generates a value of one. If, however, bit 346 has a value of zero, the AND operation generates a value of zero. The result of the AND operation is designated as an increment value 348, which is used to increment the index bits of the sample. Thus, if the AND operation generates a value of one, the corresponding index bits are incremented by a value of one prior to being used to access the lookup table, whereas the index bits are not incremented if the AND operation generates a value of zero. In essence, using the mask array 340 in this manner determines whether a bit in a particular position in the masked bits has a value of one or zero. As shown in FIG. 10A, different entries 342 have the "1" bit in different positions, resulting in a correspondingly different bit being examined in the masked bits. In summary, the foregoing process is an example of using the mask array to examine the masked bits of a sample to determine whether the index bits are to be incremented by a value of one.

Prior to returning to the description the present example of performing color conversion, attention is first directed to the features of mask array 340 indicate whether index bits of particular samples should be incremented. It has been previously explained in reference to FIG. 9 that the value of the index bits corresponds to a lattice point, and the value of the masked bits corresponds to the position of the sample between the lattice point associated with the index bits and the next higher lattice point. In effect, the masked bits contain the information that indicates the relative weight of the adjacent lattice points that would be used in linear interpolation. Moreover, because the masked bits indicate the position with respect to the adjacent lattice points, the masked bits contain the information that specifies the relative frequency at which the index bits are to be adjusted to one lattice point or the other as explained in reference to FIG. 6.

For example, in FIGS. 8B and 9, the masked bits (0111) of the R component indicate that sample 300 is located at a position $7/16^{th}$ of the distance between lattice point 330e and lattice point 330f. In order for the output for a neighborhood of samples 300 to converge to a result that approximates the output that would be obtained by performing trilinear interpolation on samples 300, $9/16^{th}$ of samples 300 should be quantized to a lattice point at R'=7 (i.e., without incrementing the index bits by one) and $7/16^{th}$ of samples 300 should be quantized to a lattice point at R'=8 (i.e., by incrementing the index bits by one).

Returning now to FIGS. 10A and 10B, entries 342 of mask array 340 have been selected to generate increment values 348 of "1" at a frequency of $7/16$ for a neighborhood of samples 300 and increment values 348 of "0" at a frequency of $9/16$. In general, the appropriate incrementing frequency is obtained for any set of four masked bits that are truncated from samples of the image data using mask array 340.

In mask array 340, it can be seen that entries 342 having the value 1000 appear at a frequency of $8/16$, entries having value 0100 appear at a frequency of $4/16$, entries having a value of 0010 appear at a frequency of $2/16$, entries having a value 0001 appear at a frequency of $1/16$, and entries having the value of 0000 appear at a frequency of $1/16$. Entries having higher-order "1" bits appear more frequently in view of the fact that higher order bits in the set of masked bits have more weight in identifying where the sample is positioned with respect to the adjacent lattice points. Assuming four masked bits, the leftmost, or most significant bit of the masked bits contributes $8/16$ of the information identifying the position of the sample with respect to the adjacent lattice points, the next most significant bit contributes $4/16$, the next most significant bit contributes $2/16$, and the rightmost, or least significant bit contributes $1/16$ of the information, which is the same frequency at which the "1" bits appear in the mask array entries 342. The entry (0000) of mask array 340 represents a special case, in which no masked bits are analyzed, but for which the index bits are not incremented.

Furthermore, entries 342 are maximally distributed or separated from like entries in mask array 340 so as to result in a desirable dither pattern of quantized samples, particularly as mask array 120 is tiled over an entire image. For instance, entries 342 having the value 1000 are diagonally adjacent to four other entries having a value of 1000. Similarly, each entry 122 having a value 0100 is diagonally adjacent to only two other entries having the value 0100. Likewise, maximal spacing between identical entries having other values is achieved by the pattern of mask array 120.

Figure 11A:
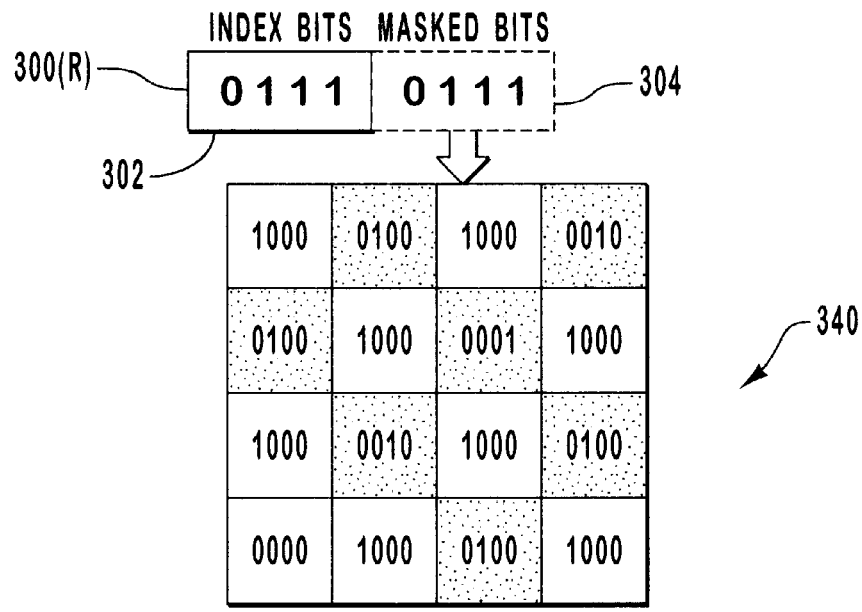
FIGS. 11A and 11B show the results of analyzing the masked bits of the red components of samples included in a neighborhood of samples, and further show which of the samples have been incremented prior to indexing the lookup table.

FIG. 11A further illustrates the process of examining the masked bits 304 of the component 300(R) of the sample using mask array 340. The entries of mask array 340 shown in crosshatch represent those that yield an increment value of one when the "1" bit of the entry is logically ANDed with the same position bit in masked bits (0111) of the sample component 300(R). It is noted that seven of the sixteen samples in the neighborhood associated with mask array 340 yield the increment value of one. As a result $7/16^{th}$ of samples 300(R) have their index bits 302 incremented by a value of one, whereas $9/16^{th}$ of samples 300(R) do not have their index bits 302 incremented. Referring back to FIG. 9, this is the desired result, in that sample 300 is located at a position $7/16$ of the distance between points 330e and 330f.

Figure 11B:
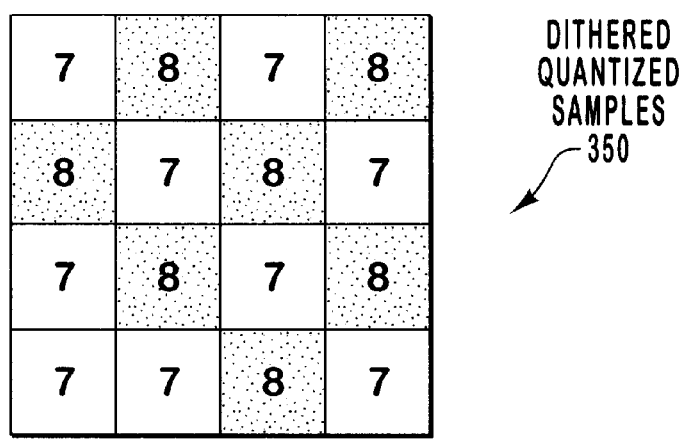

Returning again to FIG. 11A, the particular samples in the neighborhood that are incremented are maximally spaced in the neighborhood and in the entire image, assuming that mask array 340 is tiled over the image. This minimizes any aliasing or other artifacts that could otherwise be introduced if the mask array were not designed to maximally space the samples having the same quantized values. FIG. 11B further illustrates the result of use of mask array 340, with $7/16^{th}$ of the samples being mapped to lattices point having the value R'=8, with $9/16^{th}$ of the samples being mapped to lattice points having the value of $R^1$=7. The output data that is obtained by indexing the lookup table with the dithered quantized values 344 of FIG. 11B converges to an approximation, over the sample neighborhood, of the output data that could be obtained by performing linear interpolation, but with much fewer lookup table accesses per sample.

III. Mask Array Size and Multiple-Bit Dithered Quantization

The foregoing specific example of neighborhood mask dithered quantization presented in reference to FIGS. 8A–11B is an illustration of the general principles that will now be described for approximating the result of linear interpolation over a neighborhood of samples. Again, although the invention can be applied to evaluating or approximating the value of a function using known input data, the invention will be described in reference to converting color image data from RGB to a second color space.

The following discussion makes reference to these values:

T[ ][ ][ ]: three-dimensional sparse lookup table.

M[ ][ ]: two-dimensional mask array.

m: number of bits per color component of the image data.

n: number of index bits, which is related to the size of the lookup table.

t: number of masked bits, which is related to the size of the mask array.

i: number of interpolation bits.

In general, RGB image data includes m bits per color component. A sparse lookup table T[R][G][B] for generating converted color values has $1+2^n$ lattice points in each dimension, where n is an integer that is less than m. In the example presented above in reference to FIGS. 8A–11B, n=4, and there are 17 lattice points per dimension.

As the number of lattice points in each dimension of the sparse lookup table is defined by n, the number of bits included in the index bits that remain after truncation is selected to be n. In the foregoing example, each set of index bits included 4 bits, resulting in the value of the index bits specifying one of the 17 lattice points in the dimension corresponding with the index bits.

The mask array M[ ][ ] has $2^t$ entries, where t is an integer that satisfies 0<=t,<=(m−n). In the foregoing example, t=4. Moreover, there are t bits included in the masked bits that are truncated from the components of the samples of the color image data. In other words, the sum of the number of masked bits and the number of index bits cannot be larger than the number of bits originally included in a particular color component of the sample of the image data, which can be seen by referring to FIG. 7. In FIG. 7, m=8 (i.e., there are 8 bits per color component), n=4 (i.e., there are 4 index bits), and t=3 (i.e., there are 3 masked bits).

The size of the mask array specifies the size of the sample neighborhood that is needed to generate output that converges to an approximation of the output that would be obtained by performing conventional trilinear interpolation on each sample. In the example described in reference to FIGS. 8A–11B, the neighborhood size is 16, meaning that 16 samples are needed to obtain an average output that converges to or approximates the result that would have been obtained using trilinear interpolation. Implementations in which the mask array size is selected such that t=(m−n) can be referred to as "single-bit" dithered quantization.

The invention can be practiced using mask arrays having $2^t$ entries, where t is an integer that satisfies 0<=t<(m−n). In other words, for 24-bit RGB image data, the invention can be practiced using mask arrays having fewer than 16 entries. For instance, mask arrays for the 24-bit RGB implementation of the invention can have 16, 8, 4, or 2 entries or only 1 entry. It is noted that the set of masked bits of FIG. 7, in which t=3, would correspond to a mask array having $2^3$=8 entries. Mask arrays having fewer than $2^{(m-n)}$ entries or, in other words, where t<(m−n) can result in the average of the output data converging to the linear interpolation result in a smaller sample neighborhood. Implementations in which the mask array size is selected such that t<(m−n) can be referred to as "multiple-bit" dithered quantization. For example, in the 24-bit RGB data implementation, an 8-entry mask array can result in the average output converging to the interpolation result in a neighborhood of only 8 samples, which is one example of multiple-bit dithered quantization (specifically, "two-bit" dithered quantization).

In view of the foregoing, the size of the lookup table and the size of the mask array can be selected in any particular implementation as desired. The factors that are to be considered in selecting the size of these data structures include the resolution of the rendered image generated by the image forming system and the number of accesses of the lookup table and the number of calculations that are desired. In general, high pixel density of the image forming system favors large mask arrays. In contrast, systems that can efficiently access the lookup table and perform multiple calculations could favor smaller mask arrays, since smaller mask arrays increase the number of lookup table accesses and calculations per sample.

The neighborhood mask dithered quantization methods of the present invention are particularly useful in image forming systems in which the pixel density is great enough that local errors at individual pixels are not particularly noticeable to the human eye. For example, if the pixel density is high enough, the human eye could perceive a neighborhood of 16 pixels substantially as though the 16 pixels were a single pixel. In this situation, the local errors are insignificant, and converging to the output that would be obtained by linear interpolation is entirely adequate. In these situations, a 16-entry mask array (t=4) would likely be an optimum mask size.

In image forming systems that have lower pixel densities, smaller mask arrays (e.g., t=3 or t=2) may be favored, particularly if the human eye can perceive variations in color within a 16-pixel neighborhood. Using a smaller mask array enables the average output to converge to or approximate the output that would have been obtained using linear interpolation in a smaller pixel neighborhood. The tradeoff for the smaller neighborhood is more than one lookup table access per sample and increased computational complexity. For instance, when t<(m−n), which is the case for an 8-entry mask array, a 17×17×17 lookup table, and 24-bit RGB data, more than one lookup table access for some samples are required, along with some linear interpolation operations.

Referring still to FIG. 7, the bits included in the color component of the samples can include i interpolation bits, where i=(m−n−t). In the example described in reference to FIGS. 8A–11B, i=0, whereas in the example of FIG. 7, i=1. Interpolation bits are present when the size of the mask array is selected to have fewer than $2^{(m-n)}$ entries, which represents "multiple-bit" dithered quantization. As indicated above, mask arrays of this size could be selected when, for instance, the pixel density of the image forming system is relatively small.

FIGS. 12A–12D illustrate mask arrays used for examining the t masked bits in two-, three-, four-, and five-bit dithered quantization operations, respectively. It is noted that the number of bits in each entry is equal to t (except in the trivial five-bit embodiment), as the bits in each entry are used to determine whether the corresponding masked bits of the sample indicate whether the index bits are to be incremented by a value of one prior to being used as indices to the lookup table. The mask arrays of FIGS. 12A–12D are similar to mask array 340 of FIG. 10A, in that entries are included in the mask array in proportion to the significance of the corresponding bits in the masked bits. In other words, in FIG. 12A, the (100) entry appears at a frequency of 4/8, the (010) entry appears at a frequency of 2/8, the (001) entry appears at a frequency of 1/8, and the (000) entry appears at a frequency of 1/8. This distribution of entries in the mask arrays is selected based on the observation that less significant bits included in the masked bits of a sample become decreasingly informative of the relative position of a sample with respect to the adjacent lattice points of the lookup table. Based on this observation, more significant bits of the masked bits are used more frequently to determine whether the index bits are to be incremented by a value of one prior to being used to index the lookup table.

Figures 12A, 12B, 12C, 12D:
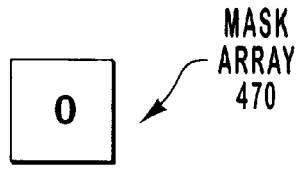
FIGS. 12A–12D illustrate mask arrays having fewer entries than the mask array of FIG. 10A, resulting in the average output data for a neighborhood of samples having the size of the mask array converging to the result that would have been obtained using conventional linear interpolation.
Figure 13:
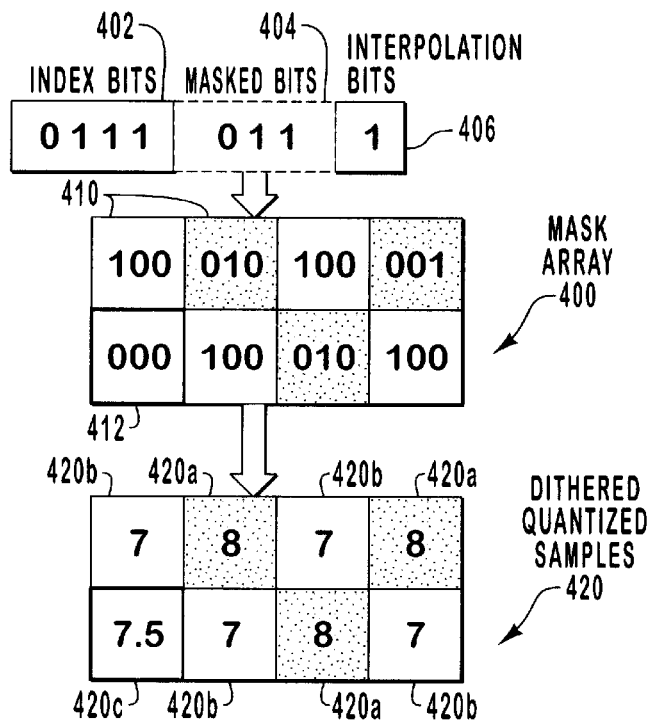
FIGS. 13–16 illustrate the results obtained according to specific examples for sample neighborhoods using the mask arrays of FIGS. 12A–12D.

In order to describe the process of performing multiple-bit dithered quantization and the use of the interpolation bits (e.g., bits 206 of FIG. 7), which are present in multiple-bit embodiments of the invention, reference is now made to the example of FIG. 13 in combination with the 8-entry (t=3) mask array 400 of FIG. 12A. In this example, and those presented in reference to FIGS. 14–16, the process of comparing masked bits with mask array entries is described in the context of a red component of a sample. However, it should be understood that in practice, the identification of the appropriate lattice point involves selecting three coordinates of the lattice point. One of the coordinates is obtained by processing the red component of the samples as explained hereinafter. Similarly, the other two coordinates are obtained by processing the green and blue components of the samples in a similar manner. In practice, the processing of the red component is accompanied by parallel or substantially contemporaneous operations for processing the green and blue components of the sample.

In a preferred embodiment of the invention, the red, green, and blue components are processed using the same entries of the same mask array, which has several advantages. First, computational complexity can be reduced. Second, using the same mask array for all three color components can minimize color artifacts. To illustrate, consider a series of gray-colored samples in which R=G=B. Using the same mask array ensures that the dithered quantized values obtained from the index bits of the RGB components for any single sample are equivalent. As a result, the output data for each sample represents gray rather than another color, although the intensity of the gray color can vary from sample to sample.

Referring now to FIG. 13, because the lookup table is assumed to have 17×17×17 lattice points, or 1+2$^n$, where n=4, the number of bits in index bits 402 are selected to be n=4. Because the mask array 400 has a number of entries equal to 2$^t$, where t=3, the number of bits in masked bits 404 is selected to be t=3. The remaining, least significant, bit is designated as an interpolation bit.

The process of determining whether the index bits 402 should be incremented prior to being used as an index to the lookup table is performed substantially as has been described in the single-bit dithered quantization example in reference to FIGS. 10B, 11A, and 11B. In particular, for entries 410 other than the entry (000), the mask array 400 is used to examine the masked bits 404 to determine whether the index bits 402 are to be incremented by a value of one prior to indexing the lookup table in the manner that has been described above in reference to FIG. 10B.

It is noted that the contribution of the three masked bits 404 results in the same frequency of incrementing the index bits in this example as the three most significant bits of the masked bits 304 in the single-bit dithered quantization example of FIG. 11A. The primary difference between the two-bit example of FIG. 13 and the single-bit example of FIG. 13 is that there is no entry of the mask array 400 that can be used to directly examine the contribution of the least significant bit (i.e., interpolation bit 406). Accordingly, the mask array entry 412 having the value (000) indicates that an interpolation operation is to be performed using the interpolation bit 406. In particular, when a sample corresponds to entry 412, the following calculation is performed:

$$(T[r+mask(0001)]+T[r])/2$$

where r represents the index bits, mask(0001) represents the operation of logically ANDing the least significant interpolation bit (i.e., the only interpolation bit 406) with a mask value "1", and T[ ] indexes the red coordinate of the lattice points of the lookup table.

In effect, when (T[r+mask(0001)]+T[r])/2 is evaluated, the result is output that gives the interpolation bit a 50% weight for the particular sample and a 1/16 weight overall. In the example of FIG. 13, since interpolation bit 406 has the value of one, the output data is that which is associated with a point midway between a lattice point at R'=7 and R'=8. In other words, the result of this operation is similar to incrementing the index bits 402 by a value of ½. Assuming that the interpolation bit 406 instead had a value of zero, the output data associated with the (000) entry of mask array 400 would simply be the output associated with a lattice point at R'=7, or in which the index bits 402 are not incremented. When at least one of the interpolation bits in this process, or in any other multiple-bit dithered quantization processes has a value of "1", the interpolation step associated with the all-zero entry (e.g., entry (000)) involves two lookup table accesses for the particular component of the sample.

FIG. 13 also depicts the dithered quantized index bits 420 that are used to index the lookup table for each of the eight samples having the value (0111 0111) according to this example. Samples 420a have a value of 8, samples 420b have a value of 7, and sample 420c has a value of 7.5, which corresponds to the result of processing the interpolation bit 406. It is noted that the average value of the quantized samples over the neighborhood depicted at 420 is 7.4375, which is comparable to the result that would have been obtained for each of the samples had linear interpolation been used. It is also noted that the interpolation operation performed on the sample 420c using interpolation bit 406 resulted in an intermediate quantized value of 7.5 being generated, and is sufficient to allow the neighborhood of eight samples to converge to an approximation of the result that would have been obtained using linear interpolation on all samples rather than the two-bit dithered quantization process of the invention.

In view of the foregoing examples and description of the various embodiments of the invention, it can be understood that single-bit dithered quantization, such as that described in reference to FIGS. 8A–11B requires only one access to the lookup table per sample. In contrast, two-bit dithered quantization as illustrated in FIG. 13, requires two accesses of the lookup table for the sample that corresponds to the (000) entry of the mask array and has a least significant bit having a value "1", although it only requires one access for the other samples. In addition, the interpolation operation performed using the interpolation bit 406 for the sample associated with mask array entry (000) requires more calculations than other operations. These considerations represent some of the tradeoffs that are involved in selecting either single-bit or multiple-bit dithered quantization.

Figure 14:
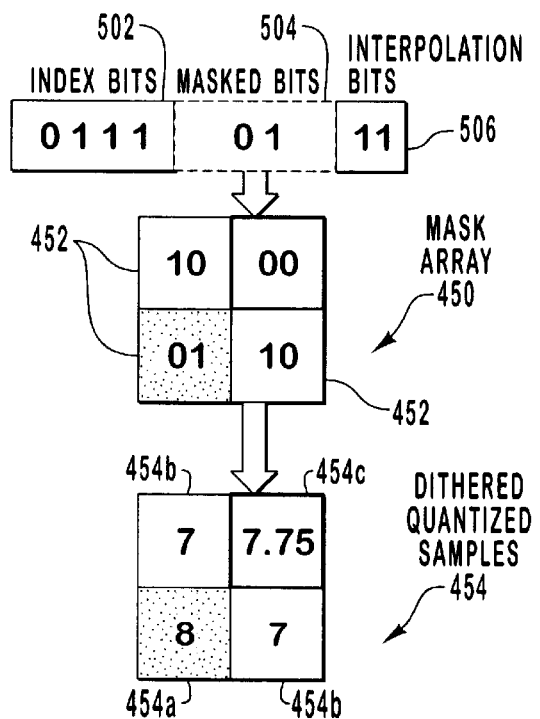

Multiple-bit dithered quantization involving smaller mask arrays and more interpolation bits require somewhat more complex computation for some samples and can result in a slightly greater average number of accesses of the lookup table per sample. Referring now to FIG. 14, three-bit dithered quantization using mask array 450 of FIG. 12B is performed substantially as has been described herein in reference to the previous examples for entries 452 other than entry (00). The masked bits 504 are examined using the mask array 450 to determine whether index bits 502 are to be incremented as has been described in reference to FIG. 10B. When a sample that corresponds to the entry (00) is processed, an interpolation operation being performed based on two interpolation bits 506 (e.g., the least significant bits of the sample) using $$(2*T[r+mask(0010)]+T[r+mask(0001)]+T[r])/4$$

where mask(0010) is a logical AND operation applied to the left interpolation bit and a "1" bit, whereas mask (0001) is a logical AND operation applied to the left interpolation bit and a "1" bit. In other words, the values of the two interpolation bits are considered in proportion to their relative significance to generate the output data.

FIG. 14 also depicts the dithered quantized index bits 454 that are used to index the lookup table for each of the eight samples having the value (0111 0111) according to this example. Sample 454a have a value of 8, samples 454b have a value of 7, and sample 454c has a value of 7.75, which corresponds to the result of processing the interpolation bits 506. It is noted that the average value of the quantized samples over the neighborhood depicted at 454 is 7.4375, which approximates the result that would have been obtained for each of the samples had conventional linear interpolation been used. It is also noted that the interpolation operation performed using entry (00) using interpolation bits 506 resulted in an intermediate quantized value of 7.75 being generated, and is sufficient to allow the neighborhood of four samples to converge to a result that approximates the result that would have been obtained using linear interpolation on all samples rather than the three-bit dithered quantization process of the invention.

Figure 15:
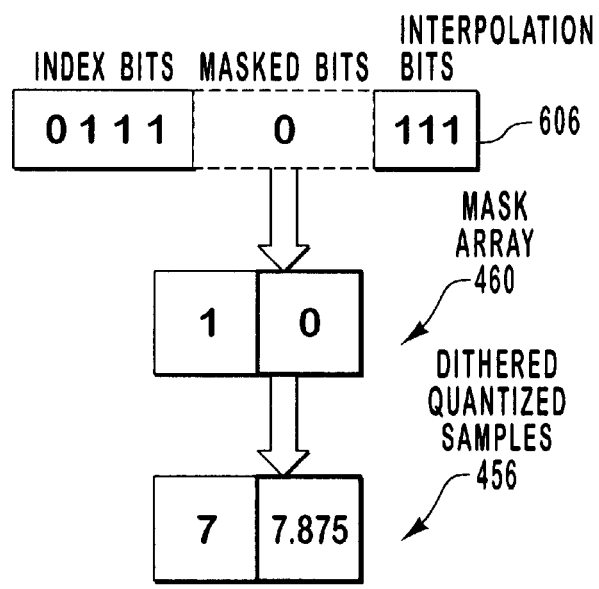

FIG. 15 illustrates four-bit dithered quantization using mask array 460 of FIG. 12C. Execution of the dithered quantization is substantially similar to the foregoing examples, with the exception that the entry (0) of mask array 460 results in an interpolation operation being performed using the three interpolation bits 606 according to the relationship $$(4*T[r+mask(0100)]+2*T[r+mask(0010)]+T[r+mask(0001)]+T[r])/8$$

where mask(0100), mask(0010), and mask(0001) represent the logical AND operation applied to the individual interpolation bits. In other words, the three bits included in interpolation bits 606 are given weights that are proportional to their significance or, at a ratio of 4:2:1 proceeding from most significant to least significant. A shown in FIG. 15, this interpolation operation yields an intermediate dithered quantized sample of 7.785. Again, the average value of the dithered quantized samples 456 over the two-sample neighborhood converges to 7.4375, which generates output data that is comparable to the output data that would have been obtained using conventional linear interpolation.

Figure 16:
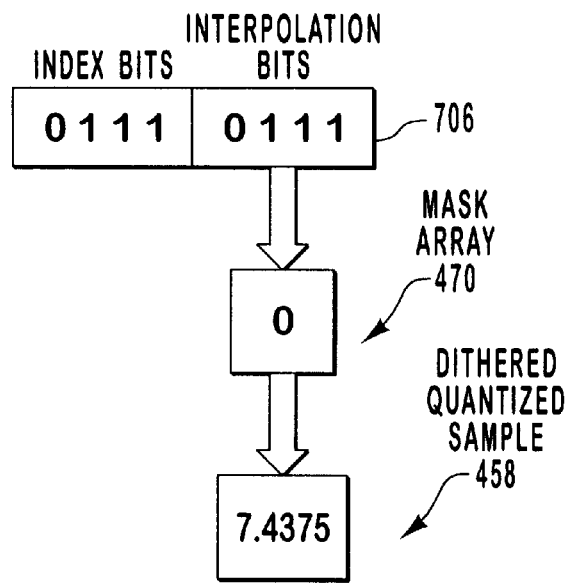

FIG. 16 illustrates five-bit dithered quantization using a trivial mask array 470 of FIG. 12D, in which the average output data over a neighborhood consisting of a single sample converges to a result that approximates the output that would have been obtained using conventional linear interpolation. The mask array 470 having a single entry, namely entry (0), results in each sample having no masked bits and four interpolation bits 706. The four interpolation bits are used to perform an interpolation operation based on the relationship $$(8*T[r+mask(1000)]+4*T[r+mask(0100)]+2*T[r+mask(0010)]+T[r+mask(0001)]+T[r])/16$$

As shown in FIG. 16, the value 7.4375 obtained for the single sample in the neighborhood yields the output data that is comparable to the output that would have been generated using conventional linear interpolation.

The foregoing description of neighborhood mask dithered quantization for 24-bit RGB image data using a 17×17×17 sparse lookup table can be generalized to other input data and other conversion functions or lookup tables. Those skilled in the art will recognize that the invention extends to any data mapping or conversion operations performed according to the general principles disclosed herein.

Other examples of performing data mapping using dithered quantization include control operations, such as controlling ignition spark advance and fuel injection metering in automobiles as functions of temperature, rpm, mass air flow, and throttle opening. These input values can be converted, using a sparse lookup table, into values representing ignition timing advance and fuel injector duty cycle, which can then be used to control the engine for efficient operation.

Heating, ventilation, and air conditioning (HVAC) systems represent another example of the applicability of the interpolation processes of the invention. In HVAC applications, the input values can be user-requested environmental conditions, current internal environmental conditions, and current external environmental conditions. In this case, the output values obtained from the sparse lookup table can include compressor and blower control signals.

Yet another example of processes to which the interpolation techniques of the invention can be applied is process control, such as that used to control plating or chemical mixing. In this case, the input values can be conductivity, opacity, temperature, specific gravity and/or other relevant parameters. The output values obtained from the sparse lookup table can include control signals for heating, stirring, and flow.

IV. Shift Arrays

Mask arrays have been described above in reference to FIGS. 10A and 12A–12D, which prescribe the action to be taken for each sample in a neighborhood to determine, based on the masked bits of the sample, whether the index bits of the sample are to be incremented prior to accessing the lookup table. The information included in the mask array can be compressed into a data structure that is designated herein as a "shift array." Each entry in a shift array represents the value of an entry in a corresponding mask array by indicating how many bits the "1" bit is to be shifted to the left to yield the value of the corresponding mask array entry.

Figure 17:
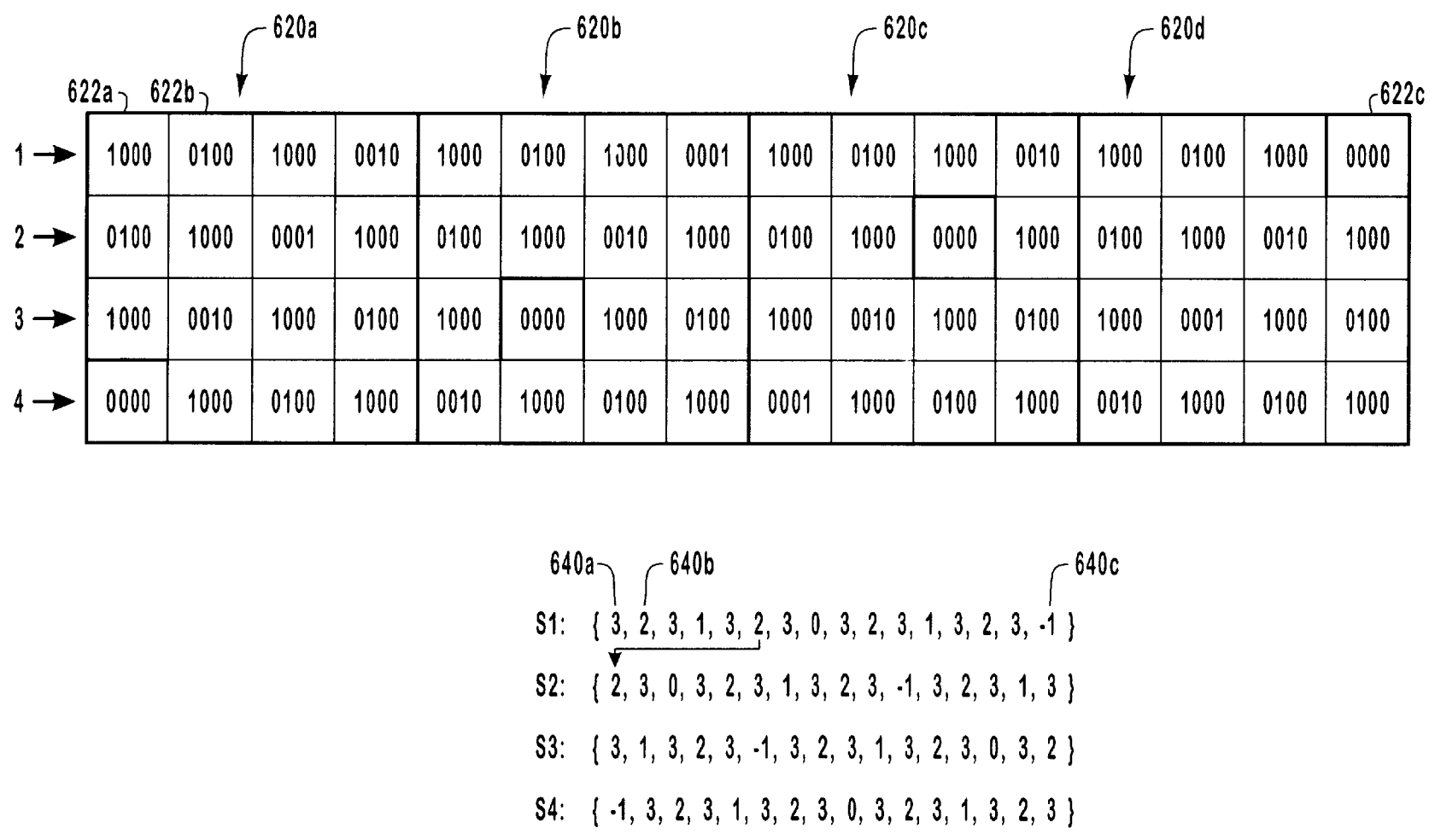

FIG. 17 illustrates four adjacent 4×4 mask arrays 620a–d tiled over a region of image data that is to be subjected to a color conversion operation. As consecutive samples of the image data in row R1 are processed, the masked bits of the samples are compared with the entries in mask arrays 620a–d. The entries in row R1 of mask arrays 620a–d are specified by the entries in shift array S1. For instance, the shift entry 640a of shift array S1 has a value of "3", which specifies that the value of mask array entry 622a is obtained by shifting the "1" bit left by three places from a base entry of (0001). Similarly, shift array entry 640b has a value of "2", which specifies that the value of mask array entry 622b can be obtained by shifting the "1" bit left by two places from a base entry of (0001). The successive entries in row R1 of mask arrays 620a–d can be obtained by shifting the "1" bit to the left by the number of places indicated by the value of the corresponding entry of shift array S1. The "−1" entry 622c of shift array S1 specifies that the corresponding mask array entry 622c is given a value of (0000), the purpose of which has previously been described.

Shift array S1 is a compressed representation of the information in row R1 of mask arrays 620a–d. Accordingly, in practice, operations in the methods of the invention that are based on information included in mask arrays can be performed by using shift arrays. Indeed, shift arrays, such as arrays S1–S4 are properly understood as being mask arrays for purposes of interpreting the claims and the description provided herein, and data structures for performing the steps or acts of the invention can comprise the compressed shift arrays or the expanded mask arrays. Shift arrays S1–S4, representing 4×4 mask arrays, can be stored using significantly less volume of data than the expanded expression of the mask arrays 620a–d. A shift array can typically be placed in a register rather than in a storage volume, thereby increasing the efficiency by reducing the number of accesses of storage volumes during runtime.

In order to achieve maximal spatial distribution of same-valued entries in mask arrays 620a–d, the entries of shift array S1 can be rotated to obtain shift array S2 that represents the mask array entries of row R2. It is noted that rotating the entries of a shift array (i.e., adjusting the positions of the entries left or right) results in another shift array in which same-valued entries are maximally spaced one from another. Rotating the shift arrays as processing advances from one row to the next ensures that same-valued entries in a single 4×4 mask array (e.g., mask array 620a) are maximally distributed, and that same-valued entries in the entire complement of tiled mask arrays 620a–d are maximally distributed. In the example of FIG. 17, the shift arrays are rotated by five positions to successively obtain shift arrays S1, S2, S3, and S4 or, in other words, the shift array entry that corresponds to the first mask array entries in rows R1–R4 is obtained by adjusting the entries of the previous shift array five positions to the left. It is noted that rotating the successive shift arrays by other amounts can also yield acceptable results. Moreover, the precise spatial distribution of entries of mask arrays 620a–d is not critical to the invention. Instead, mask arrays 620a–d can approximate the results that would be obtained by performing conventional linear interpolation when the entries of the mask arrays appear at relative frequencies that are proportional to the significance of the individual bits of the masked bits as has previously been described.

V. Overview of Processing

Figure 18:
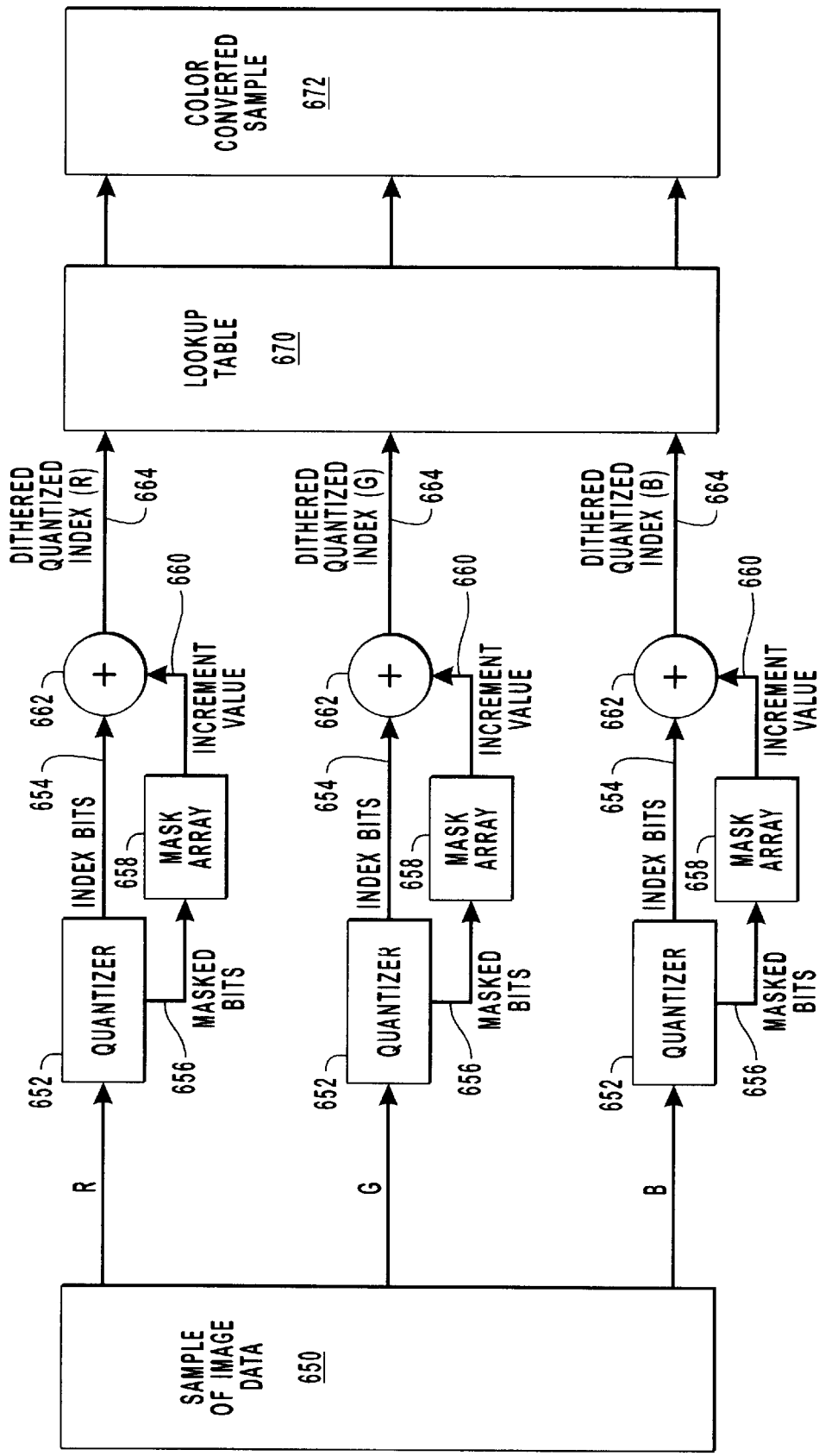
FIG. 18 is a block diagram depicting the data processing techniques according to one embodiment of the invention.

FIG. 18 is a block diagram illustrating an embodiment of the data processing of the invention in which 24-bit RGB image data is converted to a second color space. Because of the nature of the operations performed in the color conversion operation lend themselves to a hardware implementation, the quantizers 652 and adders 662 can be implemented in hardware or software, as desired, which is yet another advantage of the invention compared to conventional systems and methods.

A sample 650 of the image data includes red (R), green (G), and blue (B) components, each represented by 8 bits. Each component is passed through a quantizer 652, which outputs index bits 654 and masked bits 656. Assuming that lookup table 670 includes 17 lattice points in each of the three dimensions, each set of index bits 654 includes the four most significant bits of the R, G, or B color component. Assuming that mask array 658 is a 16-entry array, each set of masked bits 656 includes the four least significant bits. In instances where mask array is smaller and has $2^t$ entries, quantizer 652 generates a set of masked bits 656 that includes t bits and i=8−t interpolation bits, which are used as described above in reference to FIGS. 13–16.

In the example of FIG. 18, where there are assumed to be four masked bits and a 16-entry mask array 658, the masked bits 656 are compared with the entry of the mask array 658. The appropriate entry of the mask array 658 can be selected by using the row and column coordinates of sample 650 as arguments to the mask array, such that each sample is correlated with one entry of the mask array. As described in reference to FIG. 10B, the mask array 658 is used to examine the masked bits 656 to determine whether the index bits are to be incremented by a value of one. The result of this operation is an increment value 660 having a value of "0" or "1". The increment value 660 is added to index bits 654 by adder 662, effectively resulting in index bits 654 being incremented by a value of one if the operation of examining the masked bits 656 using mask array 658 generated a value of one.

The foregoing process is performed for each of the R, G, and B components of sample 650, which produces dithered quantized indices (R), (G), and (B) 664, which are used as arguments for indexing a lattice point in lookup table 670. The color values expressed in the second color space as specified by the lattice point in lookup table 670 are designated as the color-converted sample 672, which can then be used by the image forming system to render the image.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system that has access to a sparse lookup table having lattice points that convert input data to output data, a method for converting samples of input data to output data by approximating, over a neighborhood of samples, a result that would be obtained using linear interpolation, comprising the steps for:

obtaining a neighborhood of samples;

for each sample in the neighborhood of samples:

quantizing the sample by truncating from the sample one or more masked bits, such that one or more most significant index bits remain, wherein the value of the masked bits specifies a position of the sample with respect to a higher adjacent lattice point and a lower adjacent lattice point; and selectively incrementing or not incrementing the index bits based on the value of the masked bits to obtain dithered quantized index bits; and using the dithered quantized index bits as indices to the sparse lookup table, wherein the dithered quantized index bits, when considered over the neighborhood, index the lower adjacent lattice point rather than the higher adjacent lattice point at a relative frequency that is inversely proportional to ratio of the distance between the sample and the lower adjacent lattice point and the distance between the sample and the higher adjacent lattice point.

2. A method as recited in claim 1, wherein the step for using the dithered quantized index bits requires an average of only one access of the lookup table per sample.

3. A method as recited in claim 1, wherein the step for using the dithered quantized index bits requires an average of no more than two accesses of the lookup table per sample.

4. A method as recited in claim 3, wherein the lookup table has at least three dimensions.

5. A method as recited in claim 1, wherein the step for selectively incrementing or not incrementing the index bits based on the value of the masked bits comprises the act of comparing the one or more masked bits with a corresponding entry in a mask array included in the system to determine whether the value of a specific one of the masked bits indicates that the index bits are to be incremented prior to being used for indexing the lookup table.

6. A method as recited in claim 5, wherein:

the sample includes m bits;

the step for quantizing the sample is conducted by truncating t masked bits and i interpolation bits from the sample, the interpolation bits being less significant than the masked bits; and the mask array includes $2^t$ entries, each entry corresponding to one of the samples in the neighborhood.

7. A method as recited in claim 6, wherein the mask array includes one entry that, when the sample corresponding to said one entry is processed, results in the i interpolation bits being used to index the lookup table in an interpolation operation.

8. A method as recited in claim 5, wherein the act of comparing the one or more masked bits with a corresponding entry comprises the act of selecting the corresponding entry from among a plurality of entries in the mask array based on coordinates of the sample.

9. A method as recited in claim 1, wherein the method is performed in an image forming system and further comprises the act of obtaining values for the samples expressed in a second color space from lattice points of the sparse lookup table indexed by the index bits of the samples.

10. A method as recited in claim 1, wherein the method further comprises, for each of the samples included in the neighborhood of samples, the acts of:

comparing the one or more masked bits with a corresponding entry in a mask array;

if the act of comparing indicates that the index bits are to be incremented, then incrementing the index bits, otherwise not incrementing the index bits; and then using the index bits as an index to the lookup table.

11. A method as recited in claim 10, wherein the index bits of the samples of the neighborhood of samples are incremented, as opposed to not being incremented, at a frequency selected to approximate the results that would be obtained using linear interpolation.

12. In a system that has access to a sparse lookup table having lattice points that convert input data to output data, a method for assembling a data structure for determining whether quantized samples of the image data are to be incremented prior to being used as indices to the lookup table, comprising the acts of:

selecting a size of a sample neighborhood over which the results of a process of converting samples of the input data to output data are to approximate a result that would be obtained using linear interpolation on the lookup table, the sample neighborhood having the size of $2^t$ samples;

constructing the data structure, wherein entries of the data structure can be used by the system to determine whether quantized, most significant index bits of particular samples are to be incremented prior to being used as indices to the lookup table based on the value of masked bits of the particular samples that have been truncated from the index bits, the masked bits including t masked bits, where t is an integer greater than or equal to 1, the data structure including, for each masked bit $m_i$, where i represents the ith masked bit ordered from the most significant masked bit to the least significant masked bit:

$2^{(t-i)}$ entries for examining the value of the masked bit $m_i$; and storing the data structure for use in a process of converting samples of the input data to output data.

13. A method as recited in claim 12, wherein the data structure is a shift array, and wherein the entries of the shift array have values indicating which of the t masked bits is to be examined for a particular sample to determine whether the index bits of the particular sample are to be incremented.

14. A method as recited in claim 13, wherein the act of storing comprises the act of storing the shift array in a register at the system.

15. A method as recited in claim 12, wherein the data structure is a mask array, and wherein each entry has a plurality of bits equal to t, each entry of the mask array, with the exception of one entry, having one and only one bit of the value "1", which indicates which of the t masked bits is to be examined for a particular sample to determine whether the index bits of the particular sample are to be incremented.

16. A method as recited in claim 12, wherein same valued entries are maximally spatially separated one from another in the data structure.

17. A method as recited in claim 12, wherein values for said entries of the data structure occur at a frequency predetermined to approximate results that would be obtained by using linear interpolation.

* * * * *